US012591620B2

(12) United States Patent
Matos Fonseca da Trindade et al.

(10) Patent No.: US 12,591,620 B2
(45) Date of Patent: Mar. 31, 2026

(54) TEMPORAL GRAPH ANALYTICS ON PERSISTENT MEMORY

(71) Applicant: Intel Corporation, Santa Clara, CA (US)

(72) Inventors: Joana Matos Fonseca da Trindade, Somerville, MA (US); Jawad Khan, Portland, OR (US); Sanjeev Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 17/933,913

(22) Filed: Sep. 21, 2022

(65) Prior Publication Data

US 2023/0027351 A1     Jan. 26, 2023

(51) Int. Cl.
| | |
|---|---|
| *G06F 3/06* | (2006.01) |
| *G06F 16/22* | (2019.01) |
| *G06F 16/2455* | (2019.01) |
| *G06F 16/901* | (2019.01) |

(52) U.S. Cl.
CPC .......... *G06F 16/9024* (2019.01); *G06F 3/061* (2013.01); *G06F 3/0659* (2013.01); *G06F 3/068* (2013.01); *G06F 16/2264* (2019.01); *G06F 16/24558* (2019.01)

(58) Field of Classification Search
CPC .... G06F 16/9024; G06F 3/061; G06F 3/0659; G06F 3/068; G06F 16/2264; G06F 16/24558; G06F 16/24569
See application file for complete search history.

(56) References Cited

U.S. PATENT DOCUMENTS

| | | | | |
|---|---|---|---|---|
| 6,330,552 | B1 * | 12/2001 | Farrar ................ | G06Q 30/0283 |
| | | | | 707/999.001 |
| 10,216,631 | B1 * | 2/2019 | McConnell ......... | G06F 12/0808 |
| 11,200,032 | B2 * | 12/2021 | Bebee ..................... | G06F 8/311 |
| 11,855,998 | B1 * | 12/2023 | Das ........................ | G06F 16/986 |
| 12,164,534 | B2 * | 12/2024 | Karlberg ........... | G06F 16/24573 |
| 2016/0125095 | A1 * | 5/2016 | Xu ....................... | G06F 16/9024 |
| | | | | 707/740 |
| 2016/0188385 | A1 * | 6/2016 | Ekanadham ........ | G06F 16/9024 |
| | | | | 719/328 |
| 2020/0242167 | A1 * | 7/2020 | Broecheler ......... | G06F 16/9024 |

(Continued)

OTHER PUBLICATIONS

Dhulipala et al.,"Sage: Parallel Semi-Asymmetric Graph Algorithms for NVRAMs," <people.csail.mit.edu/jshun/sage.pdf>, 2020, pp. 1598-1613.

(Continued)

*Primary Examiner* — Jorge A Casanova
(74) *Attorney, Agent, or Firm* — Nicholson De Vos Webster & Elliott LLP

(57) ABSTRACT

Systems, apparatuses and methods may provide for technology that includes a single server to store a portion of a temporal graph to a first memory of the single server, and store a second portion of the temporal graph to a second memory of the single server, wherein an access rate of the first memory is greater than an access rate of the second memory, and wherein a capacity of the second memory is greater than a capacity of the first memory. The single server may also retrieve vertices of the second portion in response to a selectivity of an input query exceeding a cost model threshold.

17 Claims, 9 Drawing Sheets

<u>50</u>

52

Store a first portion of a temporal graph to a first memory of a single server

54

Store a second portion of the temporal graph to a second memory of the single server, wherein an access rate of the first memory is greater than an access rate of the second memory, and wherein a capacity of the second memory is greater than a capacity of the first memory

(56)                References Cited

U.S. PATENT DOCUMENTS

| | | | | |
|---|---|---|---|---|
| 2022/0147878 A1* | 5/2022 | Bortnikov | .............. | G06N 20/00 |
| 2025/0291806 A1* | 9/2025 | Theodorakis | ....... | G06F 16/9024 |
| 2025/0335507 A1* | 10/2025 | Wang | .................. | G06F 16/9024 |

OTHER PUBLICATIONS

Gandhi et al., "An Interval-centric Model for Distributed Computing over Temporal Graphs," <conferences.computer.org/icde/2020/pdfs/ICDE2020-5acyuqhpJ6L9P042wmjY1p/290300b129/290300b129.pdf>, 2020, pp. 1129-1140, 2020 IEEE 36th International Conference on Data Engineering (ICDE).

Gill et al., "Single Machine Graph Analytics on Massive Datasets Using Intel Optane DC Persistent Memory," <vldb.org/pvldb/vol13/p1304-gill.pdf>, 2020, pp. 1304-1318.

Github, "Raphtory: A Distributed Temporal Graph Processing System", <github.com/Raphtory/Raphtory>, Jun. 22, 2022, 4 pages.

Github, "A collection of Twitter's anonymized production cache traces" <github.com/twitter/cache-trace>, 2020, 4 pages.

Lightenberg et al., "Tink: A Temporal Graph Analytics Library for Apache Flink," <pure.tue.nl/ws/files/146479469/3184558.3186934.pdf>, 2018, 3 pages, 27th International Conference on World Wide Web (WWW).

Rost et al., "Distributed temporal graph analytics with GRADOOP," <dbs.uni-leipzig.de/fileRost2021_Article_DistributedTemporalGraphAnalyt.pdf>, May 19, 2021, 27 pages, The VLDB Journal.

Shun et al., "Brief Announcement: The Problem Based Benchmark Suite," <people.csail.mit.edu/jshun/pbbs.pdf>, Jun. 25, 2012, 3 pages, SPAA '12, Pittsburgh, Pennsylvania, USA.

Shun et al., "Ligra: a lightweight graph processing framework for shared memory," <citeseerx.ist.psu.edu/viewdoc/download?doi=10.1.1.363.7065&rep=rep1&type=pdf>, 2013, 12 pages.

Shun et al., "Smaller and Faster: Parallel Processing of Compressed Graphs with Ligra+," <people.csail.mit.edu/ishun/ligra+.pdf>, 2015, 10 pages.

Wu et al., "Path Problems in Temporal Graphs," <vldb.org/2014/program/http://www.vldb.org/pvldb/vol7/p721-wu.pdf>, 2014, Proceedings of the VLDB Endowment, vol. 7, No. 9, pp. 721-732.

Wikipedia, "Priority Search Tree," <en.wikipedia.org/wiki/Priority_search_tree>, Mar. 29, 2022, 3 pages.

* cited by examiner

20

Figure 7:
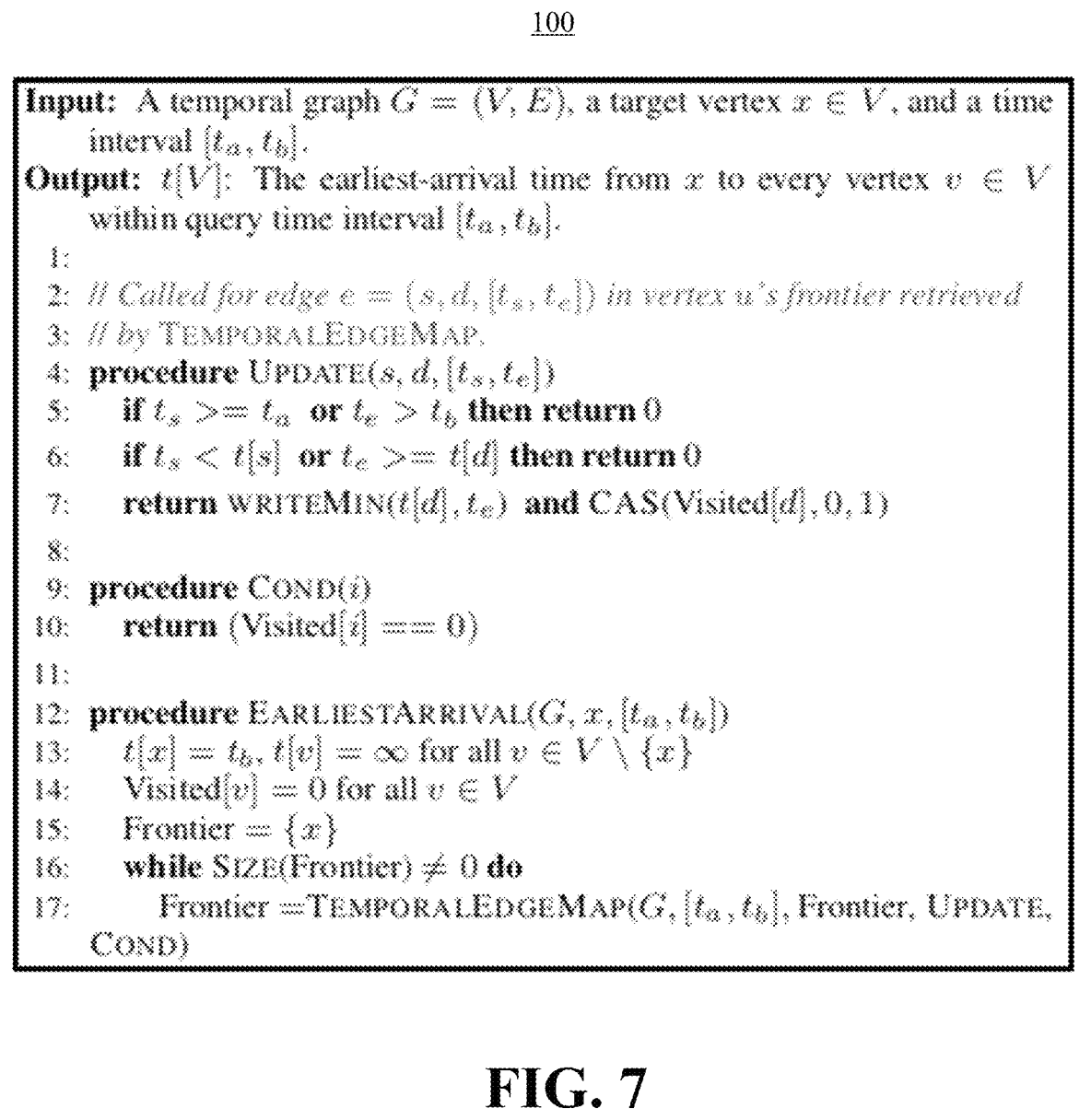

100

```
Input:  A temporal graph G = (V, E), a target vertex x ∈ V, and a time
        interval [t_a, t_b].
Output: t[V]: The earliest-arrival time from x to every vertex v ∈ V
        within query time interval [t_a, t_b].
 1:
 2:   // Called for edge e = (s, d, [t_s, t_e]) in vertex u's frontier retrieved
 3:   // by TemporalEdgeMap.
 4:   procedure UPDATE(s, d, [t_s, t_e])
 5:      if t_s >= t_a or t_e > t_b then return 0
 6:      if t_s < t[s] or t_e >= t[d] then return 0
 7:      return WRITEMIN(t[d], t_e) and CAS(Visited[d], 0, 1)
 8:
 9:   procedure COND(i)
10:      return (Visited[i] === 0)
11:
12:   procedure EARLIESTARRIVAL(G, x, [t_a, t_b])
13:      t[x] = t_b, t[v] = ∞ for all v ∈ V \ {x}
14:      Visited[v] = 0 for all v ∈ V
15:      Frontier = {x}
16:      while SIZE(Frontier) ≠ 0 do
17:         Frontier = TemporalEdgeMap(G, [t_a, t_b], Frontier, UPDATE,
      COND)
```

TEMPORAL GRAPH ANALYTICS ON PERSISTENT MEMORY

TECHNICAL FIELD

Embodiments generally relate to temporal graph analytics. More particularly, embodiments relate to the implementation of temporal graph analytics on persistent memory.

BACKGROUND OF THE DISCLOSURE

Many increasingly relevant societal problems may be naturally modeled as time-dependent processes over temporal graphs (e.g., containing edges associated with a specific moment in time and/or time duration). Examples include transportation networks, brain activity networks, user activity in social networks, and more recently, contact networks that track disease propagation. Conventional temporal graph analytics systems typically rely on iterative message passing between servers on a distributed cluster, even when the target temporal graph data fits within the memory capacity of a single server. These systems are therefore relatively inefficient at processing large-scale temporal graphs that fit within hundreds or up to a few thousand gigabytes (GB) of dynamic random access memory (DRAM) and persistent memory (PMEM, e.g., graphs with a few billions of edges or less).

BRIEF DESCRIPTION OF THE DRAWINGS

The various advantages of the embodiments will become apparent to one skilled in the art by reading the following specification and appended claims, and by referencing the following drawings, in which:

FIG. 7 is an illustration of an example of pseudo code for a temporal graph analytics task according to an embodiment;

DETAILED DESCRIPTION

Technology described herein efficiently processes large-scale temporal graphs on a single machine/server using persistent memory. More particularly, embodiments identify which vertices of a temporal graph to store in persistent memory and which vertices of the temporal graph to store in volatile memory (e.g., dynamic random access memory/DRAM). To this end, embodiments use a Priority Search Tree (PST) type of index termed a Parallel Interval PST (PIP) index to manage the vertices efficiently in appropriate locations, wherein the PIP index acts as a heap (e.g., a priority queue in which the highest (or lowest) priority element is stored at the root) in one dimension and a binary search tree (e.g., an ordered or sorted binary tree) in another dimension.

Figure 1:
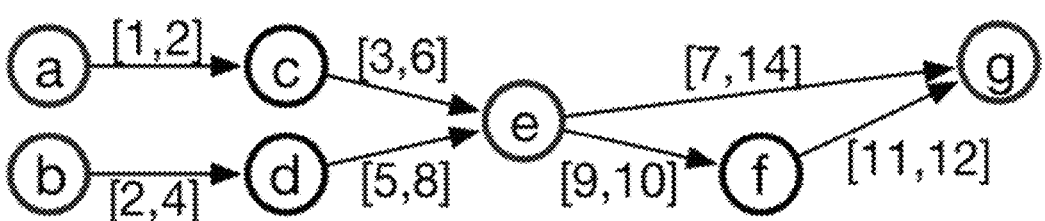
FIG. 1 is an illustration of an example of a temporal graph according to an embodiment.

FIG. 1 shows an example of a temporal graph 20 that may model, for example, a transportation network, a brain activity network, user activity in a social network, a contact network that tracks disease propagation, and so forth. In the illustrated example, vertices "a" through "g" are connected to one another via edges having start times and end times (e.g., temporal edge information). Thus, the edge from vertex "b" to vertex "d" is active from time t=2 (start time) to time t=4 (end/stop time). Alternatively, the end times may be replaced by durations or omitted altogether (e.g., assuming an end time of start time+1). The technology described herein provides programming primitives that enable application developers to specify temporal predicates used to build temporal graphics analytics applications for the temporal graph 20. The technology also prescribes solutions to storing the temporal information efficiently and correctly.

Figure 2:
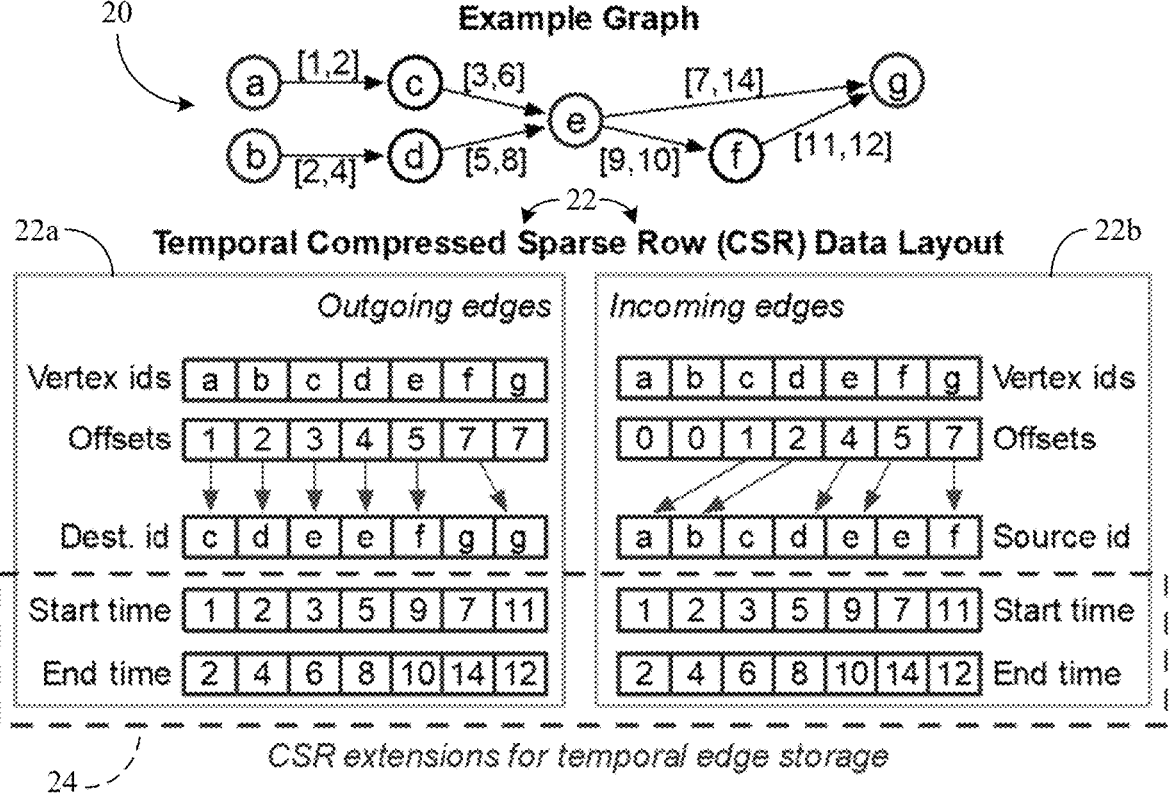
FIG. 2 is an illustration of an example of a temporal compressed-sparse row (CSR) data structure extension for a temporal graph according to an embodiment.

FIG. 2 shows a temporal compressed-sparse row (CSR) data layout 22 (22a, 22b) in which a first portion 22a of the data layout 22 stores outgoing edge information and a second portion 22b of the data layout 22 stores incoming edge information. In general, edge information for the same vertex is located in a contiguous region of memory 24. For example, the start times t=1 and t=2 for source vertex "a" and destination vertex "c" may be stored in contiguous regions of volatile memory 24 (e.g., DRAM) in a single server for both the first portion 22a and the second portion 22b. Such an approach increases locality for access to edges in the same vertex frontier (e.g., the set of vertices that are not visited but are adjacent to a visited vertex). Temporal edge data of the same type (e.g., start time and end time) may also be located in a contiguous region of the memory 24 for the same vertex. Embodiments use the CSR data layout 22 to store and retrieve edge information corresponding to relatively small vertices.

As already noted, embodiments use a Priority Search Tree (PST) type of index termed a Parallel Interval PST (PIP) index for temporal edges. In an embodiment, PIP indices are used to store and retrieve temporal edge information corresponding to relatively large vertices. Specifically, a PIP index is a type of tree-based data structure that can index two-dimensional (2D) points with O(n) space complexity, and retrieve points with O(lg n+k) runtime complexity, where k is the number of matching results to the query. This data structure may act as a heap on the Y dimension (e.g., the duration of a temporal edge), and as a binary search tree on the X dimension (e.g., the start time of a temporal edge).

Figure 3A:
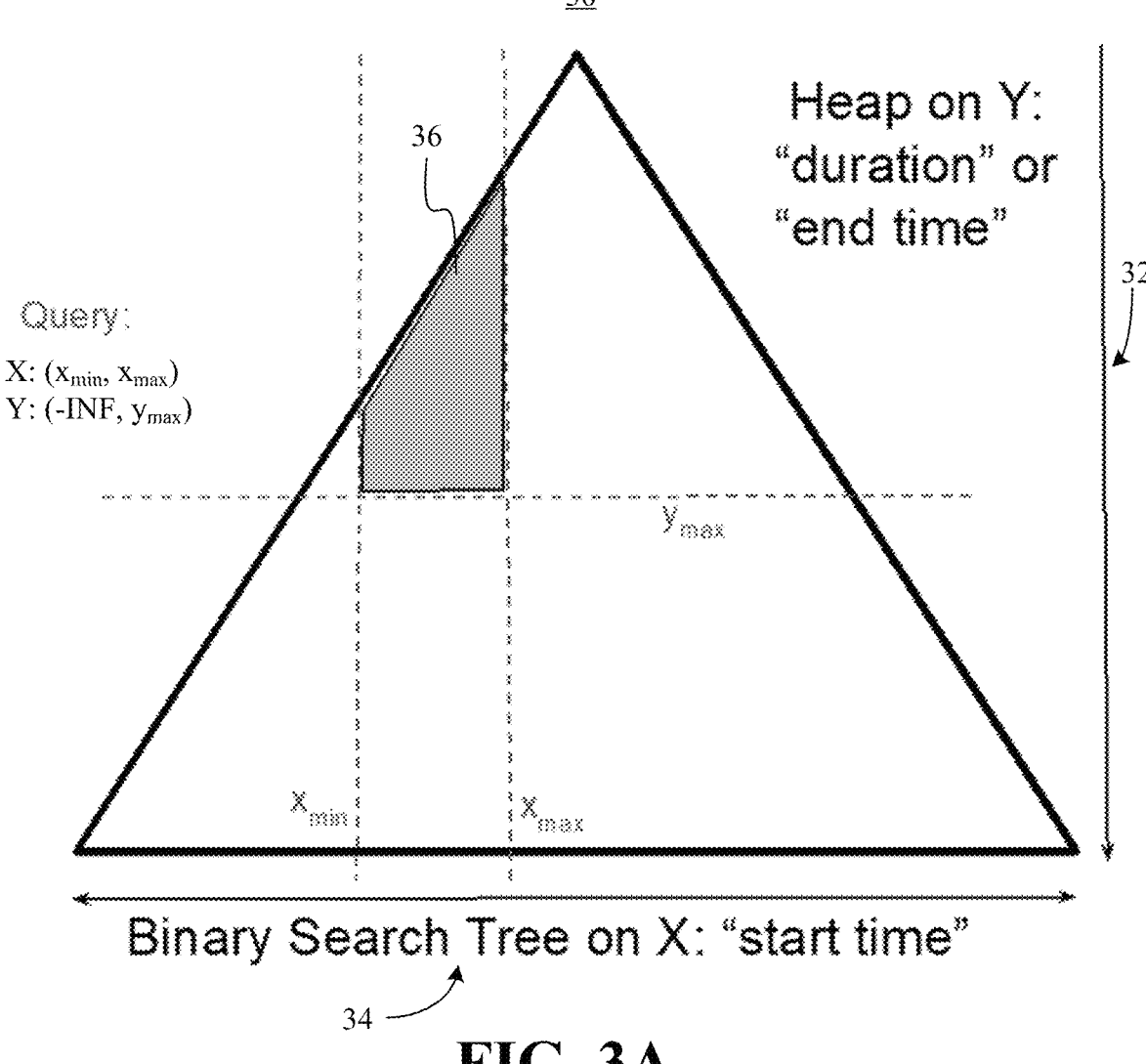
FIG. 3A is a conceptual illustration of an example of a Parallel Interval Priority Search Tree index according to an embodiment.

For example, FIG. 3A shows a PIP index 30 that may be selectively used to store and retrieve edges and vertices of a temporal graph such as, for example, the temporal graph 20 (FIGS. 1 and 2), already discussed. In the illustrated example, index data of the index 30 includes a heap in a first dimension 32 (e.g., Y dimension) and a binary search tree in a second dimension 34 (e.g., X dimension). In an embodiment, the heap includes one or more of a duration upper bound or an end time upper bound (e.g., $y_{max}$) and the binary search tree includes a start time upper bound (e.g., $x_{max}$) and a start time lower bound (e.g., $x_{min}$). Thus, a 3-sided input query might specify X: ($x_{min}$, $x_{max}$); Y: (–INF, $y_{max}$), which would return a region 36 of the temporal edges and corresponding vertices.

In one example, not all vertices are indexed via the index 30. Rather, vertices may be selectively indexed using the PIP index 30 based on their respective cardinality/degree (e.g., number of outgoing or incoming edges), wherein vertices that are indexed using the PIP index 30 are stored in PMEM (e.g., in addition to a CSR data structure in DRAM). Additionally, vertices that are indexed using the PIP index 30 may be selectively retrieved from the index 30 based on the selectivity of the input query (e.g., number of matching results relative to cost model).

Figure 3B:
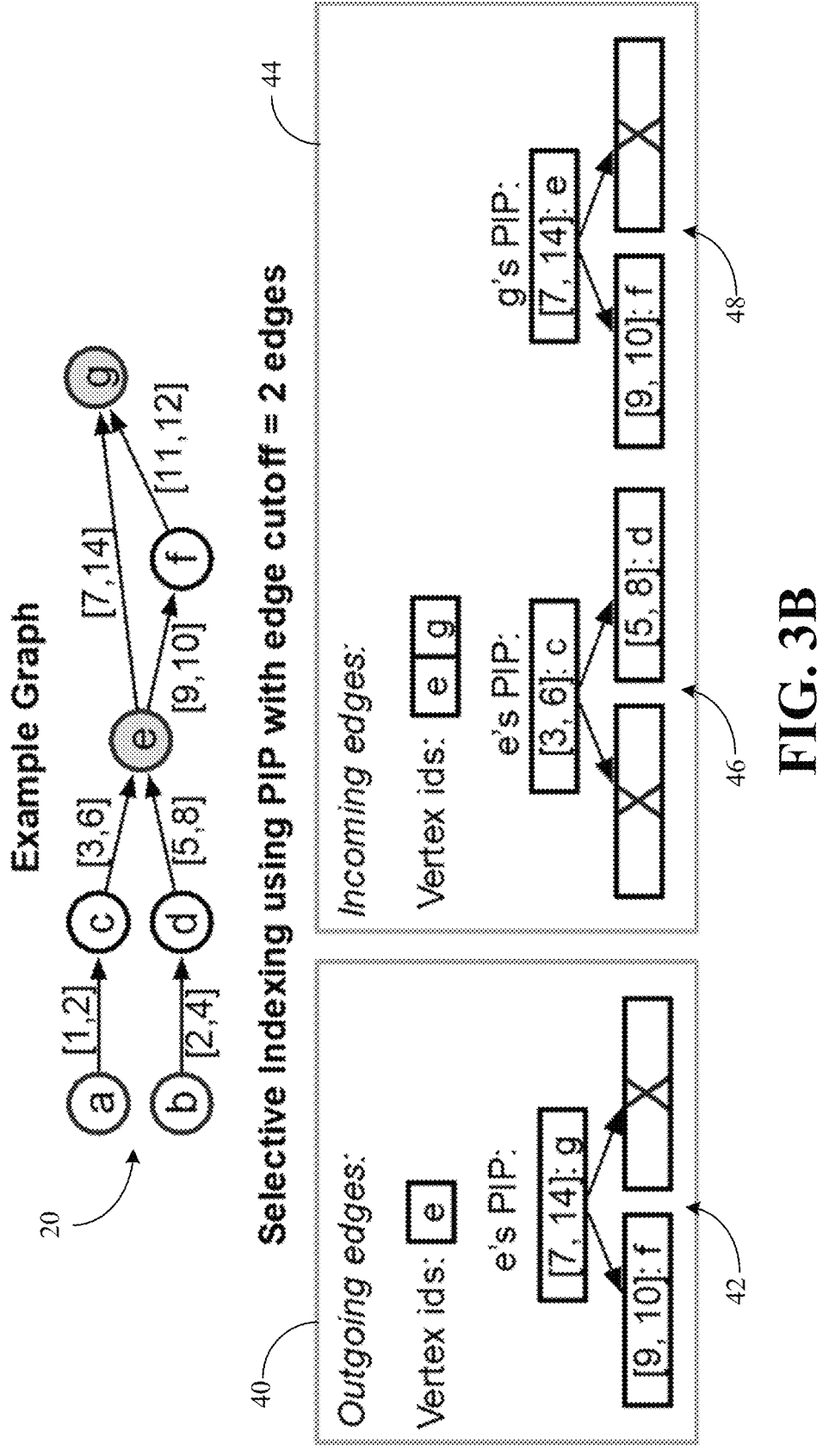
FIG. 3B is an illustration of an example of a parallel interval index layout for a temporal graph according to an embodiment.

For example, FIG. 3B shows a solution in which all vertices with more than two edges have been indexed with a PIP index. Thus, an outgoing index layout 40 uses a PIP index 42 to document the temporal information for multiple (e.g., "parallel") outgoing edges of vertex "e". Additionally, an incoming index layout 44 uses a PIP index 46 to document the temporal information for multiple/parallel incoming edges of vertex "e" and a PIP index 48 to document the temporal information for multiple/parallel incoming edges of vertex "g". In the illustrated example, the edges with the earliest start time are stored at the root of the PIP indices 42, 46, 48.

Figure 4:
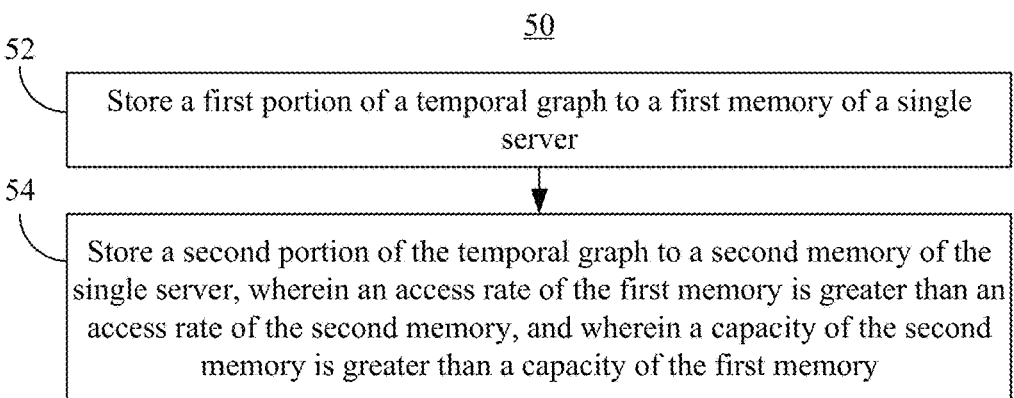
FIG. 4 is a flowchart of an example of a method of storing temporal graph vertices according to an embodiment.

FIG. 4 shows a method 50 of storing temporal graph vertices. The method 40 may be implemented in one or more modules as a set of logic instructions stored in a machine- or computer-readable storage medium such as random access memory (RAM), read only memory (ROM), programmable ROM (PROM), firmware, flash memory, etc., in hardware, or any combination thereof. For example, hardware implementations may include configurable logic, fixed-functionality logic, or any combination thereof. Examples of configurable logic (e.g., configurable hardware) include suitably configured programmable logic arrays (PLAs), field programmable gate arrays (FPGAs), complex programmable logic devices (CPLDs), and general purpose microprocessors. Examples of fixed-functionality logic (e.g., fixed-functionality hardware) include suitably configured application specific integrated circuits (ASICs), combinational logic circuits, and sequential logic circuits. The configurable or fixed-functionality logic can be implemented with complementary metal oxide semiconductor (CMOS) logic circuits, transistor-transistor logic (TTL) logic circuits, or other circuits.

Computer program code to carry out operations shown in the method 40 can be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 provides for storing a first portion of a temporal graph to a first memory (e.g., volatile memory, DRAM) of a single server. In one example, the first portion of the temporal graph is stored to the first memory in accordance with a compressed-sparse row (CSR) data structure such as, for example, the CSR data layout 22 (FIG. 2), already discussed. Moreover, block 52 may exclude index data from the first portion of the temporal graph. Block 54 stores a second portion of the temporal graph to a second memory (e.g., non-volatile memory, PMEM) of the single server, wherein an access rate (e.g., speed) of the first memory is greater than an access rate of the second memory, and wherein a capacity of the second memory is greater than a capacity of the first memory.

In an embodiment, block 54 generates index data (e.g., PIP indices) for one or more vertices of the temporal graph in response to a degree (e.g., cardinality, number of neighbors) of the one or more vertices exceeding a degree threshold (e.g., two neighbors). In such a case, block 54 may incorporate the index data into the second portion of the temporal graph that is stored to the second memory. As already noted, the index data may be organized into a heap in a first dimension and a binary search tree in a second dimension, wherein the heap includes one of a duration upper bound or an end time upper bound, and wherein the binary search tree includes a start time upper bound and a start time lower bound. The larger capacity of the second memory facilitates storage of the additional index data, while selectively indexing the vertices reduces latencies associated with the lower access rate of the second memory.

The illustrated method 50 therefore enhances performance at least to the extent that selectively partitioning the temporal graph between the first memory and the second memory on a single server eliminates reliance on iterative message passing between servers on a distributed cluster, even when the target temporal graph data fits within the memory capacity of a single server. Indeed, the method 50 enables processing of large-scale temporal graph datasets without requiring configuration and maintenance of distributed clusters specially dedicated to temporal graph analytics tasks. This approach is especially beneficial when considered on a per-dollar cost basis. The resulting systems are therefore more efficient at processing large-scale temporal graphs that fit within hundreds or up to a few thousand GB of DRAM and PMEM (e.g., graphs with a few billions of edges or less). The method 50 also leverages new types of memory (e.g., INTEL OPTANE) for a new class of graphics analytics tasks. Moreover, these performance enhancements are achievable in data-dependent implementations (e.g., earliest arrival, latest departure, fastest, shortest) that require an input source vertex identifier (ID) and have a total runtime that is heavily dependent on that choice of vertex, as well as global implementations (e.g., betweenness centrality, breadth-first-search, connected components, pagerank) that do note require an input source vertex ID and necessarily visit the entire graph.

Figure 5A:
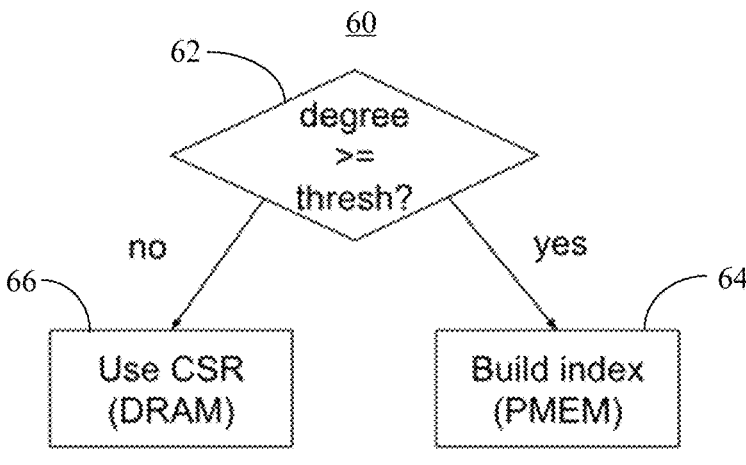
FIG. 5A is a more detailed flowchart of an example of a method of storing temporal graph vertices according to an embodiment.

FIG. 5A shows a more detailed method 60 of storing temporal graph vertices. The method 60 may be implemented in one or more modules as a set of logic instructions stored in a machine- or computer-readable storage medium RAM, ROM, PROM, firmware, flash memory, etc., in hardware, or any combination thereof.

Illustrated processing block 62 determines whether the degree of a vertex has exceeded a vertex threshold (e.g., dictated by a cost model). If so, block 64 builds an index for the vertex and stores the index in PMEM. Otherwise, block 66 uses a CSR data structure to store the vertex in DRAM.

In an embodiment, block 64 also incorporates the vertex into the CSR data structure without the index.

Therefore, if the degree of the vertex (e.g., the number of neighbors) is higher than the threshold dictated by the cost model, then a PIP index is created to store all the edges of the vertex in PMEM. Otherwise, the edges are kept in DRAM using CSR, a data structure with O(n) scan performance, but good temporal locality, as all neighbors for the same vertex are kept physically close together in memory. For example, the threshold for deciding whether to create an index for a vertex of interest might be set to, for example, 8,192 edges, based on a combination of heuristics and empirical performance of the index. Any other suitable threshold may also be suitable based on the characteristics of the dataset.

Figure 5B:
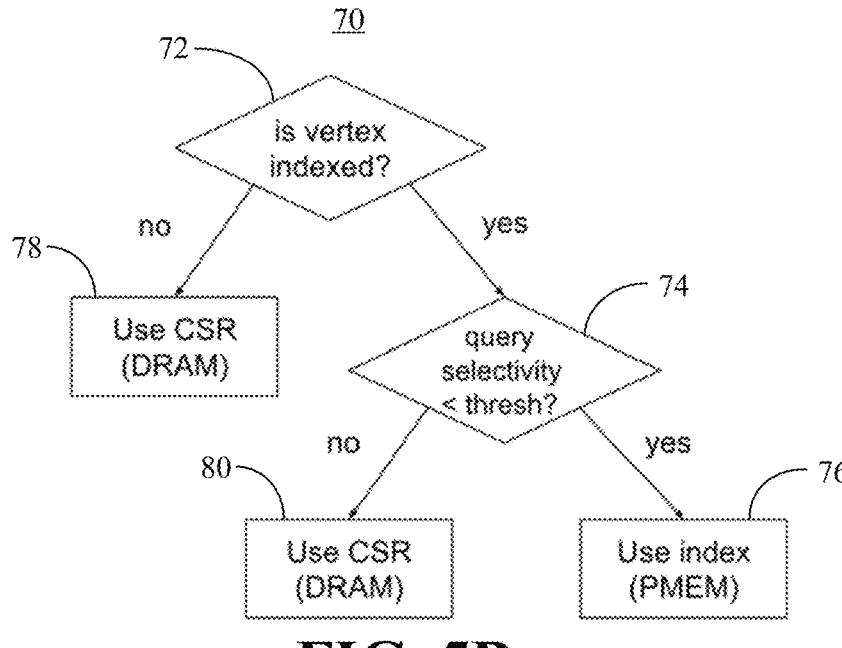
FIG. 5B is a flowchart of an example of a method of retrieving temporal graph vertices according to an embodiment.

FIG. 5B shows a method 70 of retrieving temporal graph vertices. The method 70 may be implemented in one or more modules as a set of logic instructions stored in a machine- or computer-readable storage medium RAM, ROM, PROM, firmware, flash memory, etc., in hardware, or any combination thereof.

Illustrated processing block 72 determines whether a vertex associated with an input query is indexed. If so, block 74 determines whether the selectivity of the input query is below a cost model threshold. In one example, the input query identifies one of a duration upper bound or an end time upper bound in a first dimension and the input query identifies a start time upper bound and a start time lower bound in a second dimension. If the selectivity of the input query is below the cost model threshold, block 76 uses a PIP index to retrieve the temporal edge information from PMEM. If it is determined at block 72 that the vertex is not indexed, block 78 uses the CSR data structure to retrieve the temporal edge information from DRAM. Similarly, if it is determined at block 74 that the selectivity of the input query is not below the cost model threshold, block 80 uses the CSR data structure to retrieve the temporal edge information from DRAM.

Therefore, if during the vertex storage phase the vertex in question was deemed too small for indexing, then any accesses to the edges of the vertex are directed to the corresponding location on the in-memory (DRAM) CSR data structure. Otherwise, if the vertex was indexed, then a cardinality estimator is consulted to check whether the selectivity of the input query is less than the cost model threshold. If the selectivity is smaller, then the query is directed to the PIP index (e.g., stored in PMEM) for that vertex. Otherwise, the query is answered by performing a parallel linear scan over the CSR data structure (e.g., stored in DRAM).

Figure 6:
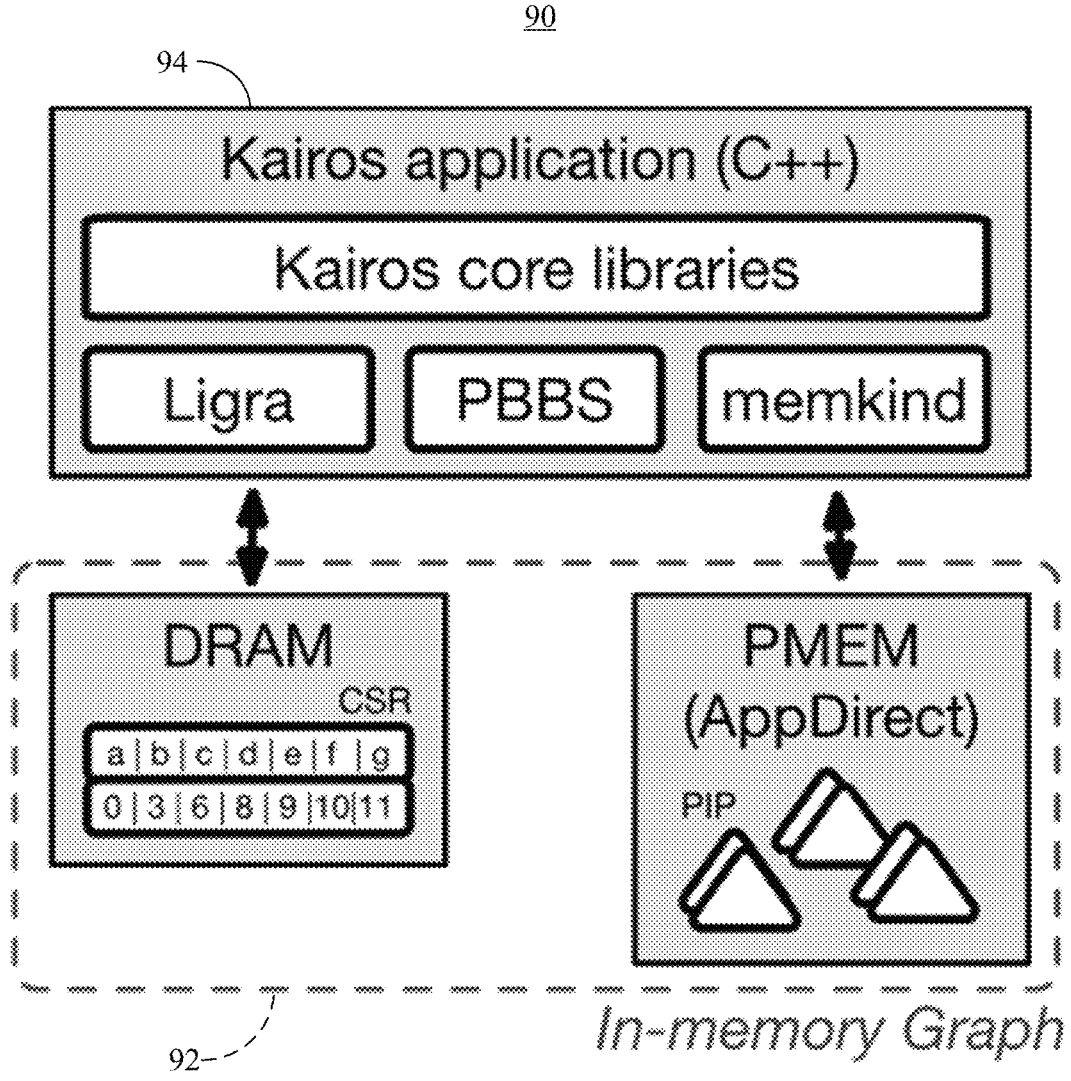
FIG. 6 is a block diagram of an example of a temporal graph analytics architecture according to an embodiment.

FIG. 6 shows a temporal graphics analytics application architecture 90 that includes an in-memory temporal graph 92. The illustrated architecture 90 uses a KAIROS application including KAIROS core libraries, LIGRA and PBBS (Problem Based Benchmark Suite) parallel graph processing libraries that have been extended to support storage and retrieval of temporal edge information. All temporal graph indexes (PIP indices) are stored in PMEM using AppDirect mode, while the temporal graph CSR is stored in DRAM.

Figure 8:
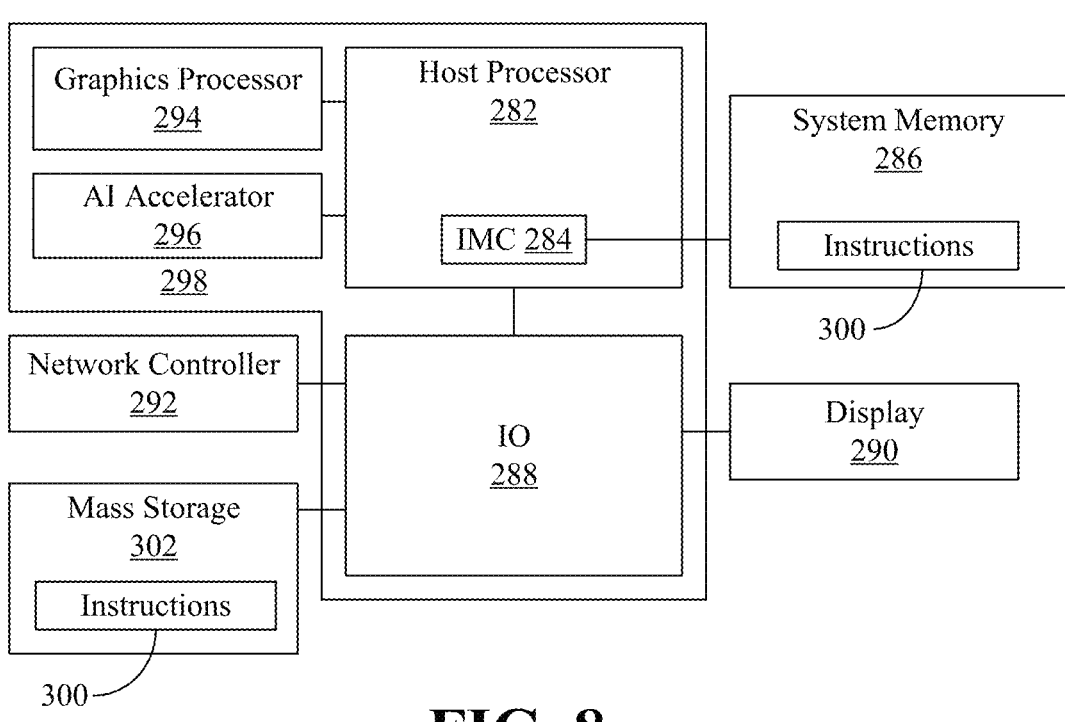
FIG. 8 is a block diagram of an example of a performance-enhanced computing system according to an embodiment.

FIG. 8 shows pseudo code 100 for a temporal graph analytics task (e.g., single-source earliest arrival), wherein the pseudo code 100 exposes primitives for accessing temporal information associated with edges. Specifically, the "TemporalEdgeMap" programming construct relies on the method 50 (FIG. 4), the method 60 (FIG. 5A) and the method 70 (FIG. 5B) to fetch temporal edges for each vertex frontier during traversal (e.g., line 17).

Turning now to FIG. 8, a performance-enhanced computing system 280 is shown. The system 280 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), Internet of Things (IoT) functionality, etc., or any combination thereof In the illustrated example, the system 280 includes a host processor 282 (e.g., central processing unit/CPU) having an integrated memory controller (IMC) 284 that is coupled to a system memory 286 (e.g., dual inline memory module/DIMM). In an embodiment, an IO (input/output) module 288 is coupled to the host processor 282. The illustrated IO module 288 communicates with, for example, a display 290 (e.g., touch screen, liquid crystal display/LCD, light emitting diode/LED display), mass storage 302 (e.g., hard disk drive/HDD, optical disc, solid state drive/SSD) and a network controller 292 (e.g., wired and/or wireless). The host processor 282 may be combined with the IO module 288, a graphics processor 294, and an AI accelerator 296 into a system on chip (SoC) 298.

In an embodiment, the host processor 282 and/or the AI accelerator 296 executes a set of program instructions 300 retrieved from the mass storage 302 and/or the system memory 286 to perform one or more aspects of the method 50 (FIG. 4), the method 60 (FIG. 5A) and/or the method 70 (FIG. 5B), already discussed. Thus, execution of the illustrated instructions 300 by the host processor 282 and/or the AI accelerator 296 causes the host processor 282 and/or the AI accelerator 296 to store a first portion of a temporal graph to the system memory 286 (e.g., first memory) of the computing system 280 and store a second portion of the temporal graph to the mass storage 302 (e.g., second memory), wherein an access rate of the system memory 286 is greater than an access rate of the mass storage 302, and wherein a capacity of the mass storage 302 is greater than a capacity of the system memory 286. Execution of the illustrated instructions 300 by the host processor 282 and/or the AI accelerator 296 may also cause the host processor 282 and/or the AI accelerator 296 to retrieve vertices of the second portion in response to a selectivity of an input query being below a cost model threshold. In one example, the input query identifies one of a duration or an end time upper bound in a first dimension and identifies a start time upper bound and a start time lower bound in a second dimension.

The computing system 280 is therefore considered performance-enhanced at least to the extent that selectively partitioning the temporal graph between the system memory 286 and the mass storage 302 on the computing system 280 (e.g., single server) eliminates reliance on iterative message passing between servers on a distributed cluster, even when the target temporal graph data fits within the memory capacity of a single server. Indeed, the computing system 280 enables processing of large-scale temporal graph datasets without requiring configuration and maintenance of distributed clusters specially dedicated to temporal graph analytics tasks. This approach is especially beneficial when considered on a per-dollar cost basis. The resulting computing system 280 is therefore more efficient at processing large-scale temporal graphs that fit within hundreds or up to a few thousand GB of DRAM and PMEM (e.g., graphs with a few billions of edges or less). The computing system 280 also leverages new types of memory (e.g., INTEL OPTANE) for a new class of graphics analytics tasks.

Figure 9:
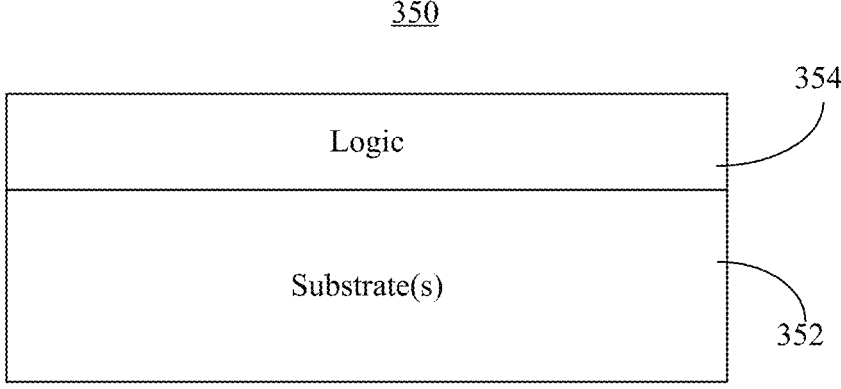
FIG. 9 is an illustration of an example of a semiconductor package apparatus according to an embodiment.

FIG. 9 shows a semiconductor apparatus 350 (e.g., chip, die, package). The illustrated apparatus 350 includes one or more substrates 352 (e.g., silicon, sapphire, gallium arsenide) and logic 354 (e.g., transistor array and other integrated circuit/IC components) coupled to the substrate(s) 352. In an embodiment, the logic 354 implements one or more aspects of the method 50 (FIG. 4), the method 60 (FIG. 5A) and/or the method 70 (FIG. 5B), already discussed.

The logic 354 may be implemented at least partly in configurable or fixed-functionality hardware. In one example, the logic 354 includes transistor channel regions that are positioned (e.g., embedded) within the substrate(s) 352. Thus, the interface between the logic 354 and the substrate(s) 352 may not be an abrupt junction. The logic 354 may also be considered to include an epitaxial layer that is grown on an initial wafer of the substrate(s) 352.

Figure 10:
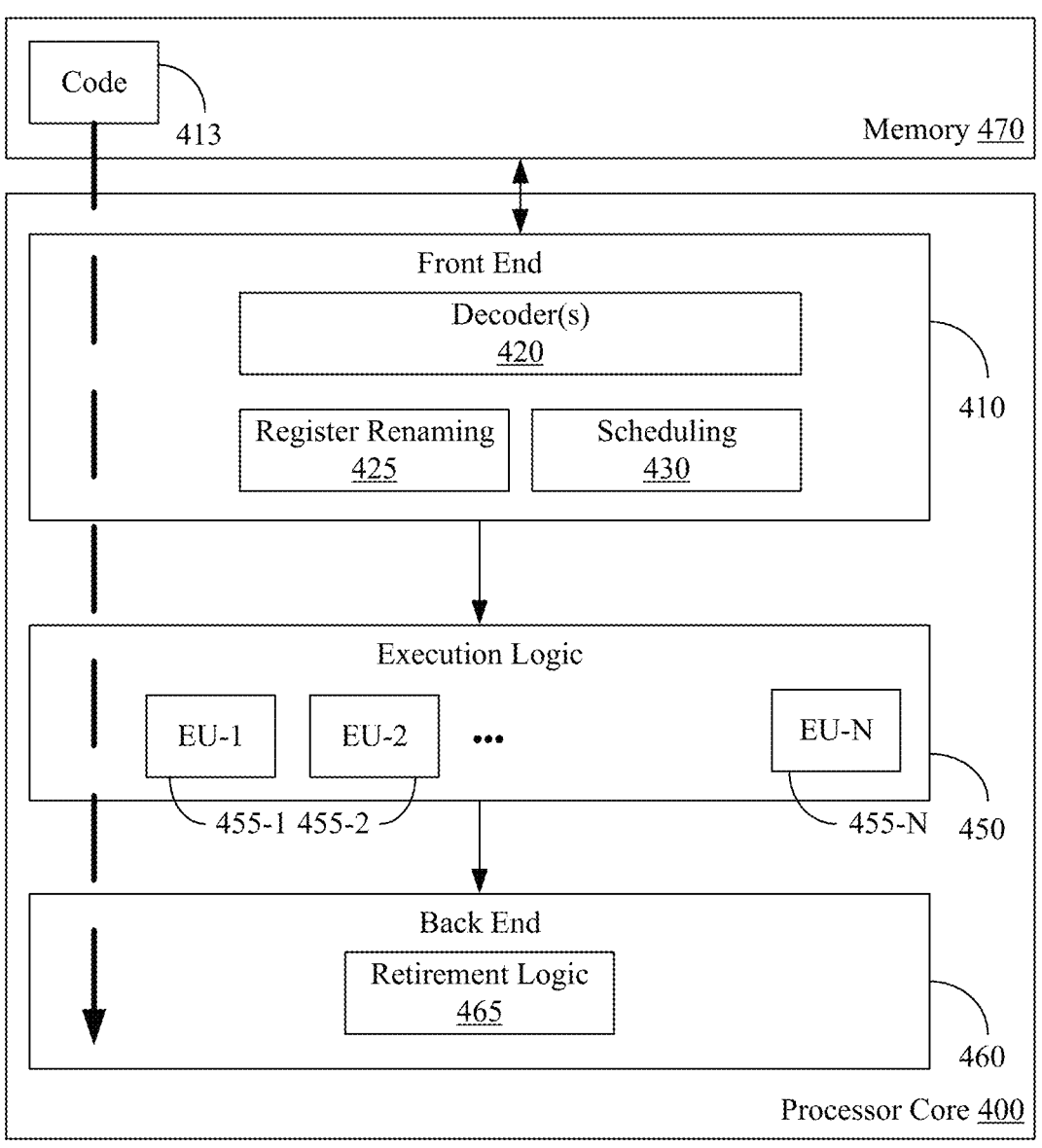
FIG. 10 is a block diagram of an example of a processor according to an embodiment.

FIG. 10 illustrates a processor core 400 according to one embodiment. The processor core 400 may be the core for any type of processor, such as a micro-processor, an embedded processor, a digital signal processor (DSP), a network processor, or other device to execute code. Although only one processor core 400 is illustrated in FIG. 10, a processing element may alternatively include more than one of the processor core 400 illustrated in FIG. 10. The processor core 400 may be a single-threaded core or, for at least one embodiment, the processor core 400 may be multithreaded in that it may include more than one hardware thread context (or "logical processor") per core.

FIG. 10 also illustrates a memory 470 coupled to the processor core 400. The memory 470 may be any of a wide variety of memories (including various layers of memory hierarchy) as are known or otherwise available to those of skill in the art. The memory 470 may include one or more code 413 instruction(s) to be executed by the processor core 400, wherein the code 413 may implement the method 50 (FIG. 4), the method 60 (FIG. 5A) and/or the method 70 (FIG. 5B), already discussed. The processor core 400 follows a program sequence of instructions indicated by the code 413. Each instruction may enter a front end portion 410 and be processed by one or more decoders 420. The decoder 420 may generate as its output a micro operation such as a fixed width micro operation in a predefined format, or may generate other instructions, microinstructions, or control signals which reflect the original code instruction. The illustrated front end portion 410 also includes register renaming logic 425 and scheduling logic 430, which generally allocate resources and queue the operation corresponding to the convert instruction for execution.

The processor core 400 is shown including execution logic 450 having a set of execution units 455-1 through 455-N. Some embodiments may include a number of execution units dedicated to specific functions or sets of functions. Other embodiments may include only one execution unit or one execution unit that can perform a particular function. The illustrated execution logic 450 performs the operations specified by code instructions.

After completion of execution of the operations specified by the code instructions, back end logic 460 retires the instructions of the code 413. In one embodiment, the processor core 400 allows out of order execution but requires in order retirement of instructions. Retirement logic 465 may take a variety of forms as known to those of skill in the art (e.g., re-order buffers or the like). In this manner, the processor core 400 is transformed during execution of the code 413, at least in terms of the output generated by the decoder, the hardware registers and tables utilized by the register renaming logic 425, and any registers (not shown) modified by the execution logic 450.

Although not illustrated in FIG. 10, a processing element may include other elements on chip with the processor core 400. For example, a processing element may include memory control logic along with the processor core 400. The processing element may include I/O control logic and/or may include I/O control logic integrated with memory control logic. The processing element may also include one or more caches.

Figure 11:
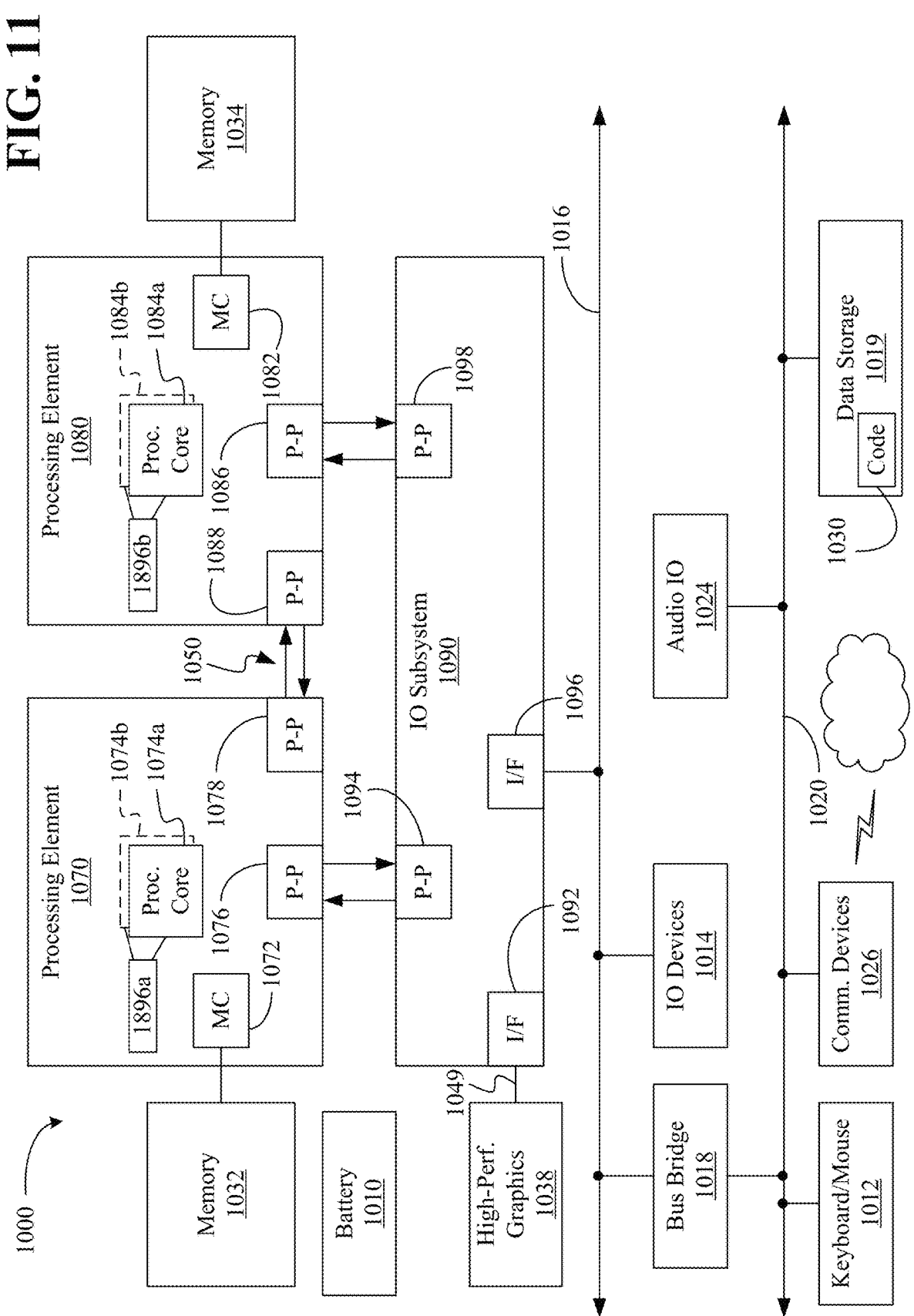
FIG. 11 is a block diagram of an example of a multi-processor based computing system according to an embodiment.

Referring now to FIG. 11, shown is a block diagram of a computing system 1000 embodiment in accordance with an embodiment. Shown in FIG. 11 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 11 may be implemented as a multi-drop bus rather than point-to-point interconnect.

As shown in FIG. 11, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 10.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 11, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 11, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 11, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 50 (FIG. 4), the method 60 (FIG. 5A) and/or the method 70 (FIG. 5B), already discussed. Further, an audio I/O 1024 may be coupled to second bus 1020 and a battery 1010 may supply power to the computing system 1000.

Note that other embodiments are contemplated. For example, instead of the point-to-point architecture of FIG. 11, a system may implement a multi-drop bus or another such communication topology. Also, the elements of FIG. 11 may alternatively be partitioned using more or fewer integrated chips than shown in FIG. 11.

ADDITIONAL NOTES AND EXAMPLES

Example 1 includes a performance-enhanced single server comprising a network controller, a processor coupled to the network controller, and a memory structure coupled to the processor, the memory structure including a first memory and a second memory, wherein an access rate of the first memory is greater than an access rate of the second memory, and wherein a capacity of the second memory is greater than a capacity of the first memory, the memory structure further including a set of instructions, which when executed by the processor, cause the processor to store a first portion of a temporal graph to the first memory, and store a second portion of the temporal graph to the second memory.

Example 2 includes the single server of Example 1, wherein the instructions, when executed, further cause the single server to generate index data for one or more vertices of the temporal graph in response to a degree of the one or more vertices exceeding a degree threshold, and incorporate the index data into the second portion.

Example 3 includes the single server of Example 2, wherein the instructions, when executed, further cause the single server to organize the index data into a heap in a first dimension and a binary search tree in a second dimension.

Example 4 includes the single server of any one of Examples 1 to 3, wherein the first portion of the temporal graph is stored to the first memory in accordance with a compressed-sparse row data structure.

Example 5 includes the single server of Example 1, wherein the instructions, when executed, further cause the processor to exclude index data from the first portion of the temporal graph.

Example 6 includes the single server of Example 1, wherein the instructions, when executed, further cause the processor to retrieve vertices of the second portion in response to a selectivity of an input query being below a cost model threshold, wherein the input query is to identify one of a duration upper bound or an end time upper bound in a first dimension, and wherein the input query is to identify a start time upper bound and a start time lower bound in a second dimension.

Example 7 includes at least one computer readable storage medium comprising a set of instructions, which when executed by a single server, cause the single server to store a first portion of a temporal graph to a first memory of the single server, and store a second portion of the temporal graph to a second memory of the single server, wherein an access rate of the first memory is greater than an access rate of the second memory, and wherein a capacity of the second memory is greater than a capacity of the first memory.

Example 8 includes the at least one computer readable storage medium of Example 7, wherein the instructions, when executed, further cause the single server to generate index data for one or more vertices of the temporal graph in response to a degree of the one or more vertices exceeding a degree threshold, and incorporate the index data into the second portion.

Example 9 includes the at least one computer readable storage medium of Example 8, wherein the instructions, when executed, further cause the single server to organize the index data into a heap in a first dimension and a binary search tree in a second dimension.

Example 10 includes the at least one computer readable storage medium of any one of Examples 7 to 9, wherein the first portion of the temporal graph is stored to the first memory in accordance with a compressed-sparse row data structure.

Example 11 includes the at least one computer readable storage medium of Example 7, wherein the instructions, when executed, further cause the single server to exclude index data from the first portion of the temporal graph.

Example 12 includes the at least one computer readable storage medium of Example 7, wherein the instructions, when executed, further cause the single server to retrieve vertices of the second portion in response to a selectivity of an input query being below a cost model threshold, wherein the input query is to identify one of a duration upper bound or an end time upper bound in a first dimension, and wherein the input query is to identify a start time upper bound and a start time lower bound in a second dimension.

Example 13 includes a semiconductor apparatus comprising one or more substrates, and logic coupled to the one or more substrates, wherein the logic is implemented at least partly in one or more of configurable or fixed-functionality hardware, the logic to store a first portion of a temporal graph to a first memory of a single server, and store a second portion of the temporal graph to a second memory of the single server, wherein an access rate of the first memory is greater than an access rate of the second memory, and wherein a capacity of the second memory is greater than a capacity of the first memory.

Example 14 includes the semiconductor apparatus of Example 13, wherein the logic is to generate index data for one or more vertices of the temporal graph in response to a degree of the one or more vertices exceeding a degree threshold, and incorporate the index data into the second portion.

Example 15 includes the semiconductor apparatus of Example 14, wherein the logic is to organize the index data into a heap in a first dimension and a binary search tree in a second dimension.

Example 16 includes the semiconductor apparatus of any one of Examples 13 to 15, wherein the first portion of the temporal graph is stored to the first memory in accordance with a compressed-sparse row data structure.

Example 17 includes the semiconductor apparatus of Example 13, wherein the logic is to exclude index data from the first portion of the temporal graph.

Example 18 includes the semiconductor apparatus of Example 13, wherein the logic is to retrieve vertices of the second portion in response to a selectivity of an input query being below a cost model threshold, wherein the input query is to identify one of a duration upper bound or an end time upper bound in a first dimension, and wherein the input query is to identify a start time upper bound and a start time lower bound in a second dimension.

Example 19 includes the semiconductor apparatus of Example 13, wherein the logic coupled to the one or more substrates includes transistor channel regions that are positioned within the one or more substrates.

Example 20 includes a method of operating a single server, the method comprising storing a first portion of a temporal graph to a first memory of the single server, and storing a second portion of the temporal graph to a second memory of the single server, wherein an access rate of the first memory is greater than an access rate of the second memory, and wherein a capacity of the second memory is greater than a capacity of the first memory.

Example 21 includes the method of Example 20, further including generating index data for one or more vertices of the temporal graph in response to a degree of the one or more vertices exceeding a degree threshold, and incorporating the index data into the second portion.

Example 22 includes the method of Example 21, further including organizing the index data into a heap in a first dimension and a binary search tree in a second dimension.

Example 23 includes the method of any one of Examples 20 to 22, wherein the first portion of the temporal graph is stored to the first memory in accordance with a compressed-sparse row data structure.

Example 24 includes the method of Example 20, further including excluding index data from the first portion of the temporal graph.

Example 25 includes the method of Example 20, further including retrieving vertices of the second portion in response to a selectivity of an input query being below a cost model threshold, wherein the input query identifies one of a duration upper bound or an end time upper bound in a first dimension, and wherein the input query identifies a start time upper bound and a start time lower bound in a second dimension.

Example 26 includes an apparatus comprising means for performing the method of any one of Examples 20 to 25.

Technology described herein therefore relies on a shared-memory programming model, using fork-join parallelism and a highly optimized parallel data structure as a temporal graph index to maximize performance of graph processing tasks involved in temporal graph analytics (e.g., obviating a need for large-scale distributed processing). Further, the technology introduces the notion of "selective indexing" and an accompanying cost model to decide when it is beneficial to use the temporal graph index over a traditional approach of linear scanning in-memory CSR data structures. Moreover, the technology offloads the temporal graph index from DRAM to PMEM by considering both the query workload as well as underlying temporal graph data characteristics (e.g., selectively applying the specialized index only on the subset of vertices where it is beneficial).

In addition, the technology described herein takes advantage of skew that is often present in both the temporal graph data and the temporal graph query workloads (e.g., in contrast to conventional solutions that assume input graphs at best only have weights as edge data). When applied together, these solutions can yield up to 6× end-to-end query latency improvements. Additionally, once single server analytics are optimized, the technology may be easily applied to multiple servers.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A single server comprising:
a network controller;
a processor coupled to the network controller; and
a memory structure coupled to the processor, the memory structure including a first memory and a second memory, wherein an access rate of the first memory is greater than an access rate of the second memory, and wherein a capacity of the second memory is greater than a capacity of the first memory, the memory structure further including a set of instructions, which when executed by the processor, cause the processor to:
store a first portion of a temporal graph to the first memory;
generate index data for one or more vertices of the temporal graph in response to a degree of the one or more vertices exceeding a degree threshold;
organize the index data into a heap in a first dimension and a binary search tree in a second dimension;
incorporate the index data into a second portion of the temporal graph; and
store the second portion of the temporal graph to the second memory.

2. The single server of claim 1, wherein the first portion of the temporal graph is stored to the first memory in accordance with a compressed-sparse row data structure.

3. The single server of claim 1, wherein the instructions, when executed, further cause the processor to exclude index data from the first portion of the temporal graph.

4. The single server of claim 1, wherein the instructions, when executed, further cause the processor to retrieve vertices of the second portion in response to a selectivity of an input query being below a cost model threshold, wherein the input query is to identify one of a duration upper bound or an end time upper bound in a first dimension, and wherein the input query is to identify a start time upper bound and a start time lower bound in a second dimension.

5. At least one non-transitory computer readable storage medium comprising a set of instructions, which when executed by a single server, cause the single server to:
store a first portion of a temporal graph to a first memory of the single server;

generate index data for one or more vertices of the temporal graph in response to a degree of the one or more vertices exceeding a degree threshold;
organize the index data into a heap in a first dimension and a binary search tree in a second dimension;
incorporate the index data into a second portion of the temporal graph; and
store the second portion of the temporal graph to a second memory of the single server, wherein an access rate of the first memory is greater than an access rate of the second memory, and wherein a capacity of the second memory is greater than a capacity of the first memory.

6. The at least one non-transitory computer readable storage medium of claim 5, wherein the first portion of the temporal graph is stored to the first memory in accordance with a compressed-sparse row data structure.

7. The at least one non-transitory computer readable storage medium of claim 5, wherein the instructions, when executed, further cause the single server to exclude index data from the first portion of the temporal graph.

8. The at least one non-transitory computer readable storage medium of claim 5, wherein the instructions, when executed, further cause the single server to retrieve vertices of the second portion in response to a selectivity of an input query being below a cost model threshold, wherein the input query is to identify one of a duration upper bound or an end time upper bound in a first dimension, and wherein the input query is to identify a start time upper bound and a start time lower bound in a second dimension.

9. A semiconductor apparatus comprising:
one or more substrates; and
logic coupled to the one or more substrates, wherein the logic is implemented at least partly in one or more of configurable or fixed-functionality hardware, the logic to:
store a first portion of a temporal graph to a first memory of a single server;
generate index data for one or more vertices of the temporal graph in response to a degree of the one or more vertices exceeding a degree threshold;
organize the index data into a heap in a first dimension and a binary search tree in a second dimension;
incorporate the index data into a second portion of the temporal graph; and
store the second portion of the temporal graph to a second memory of the single server, wherein an access rate of the first memory is greater than an access rate of the second memory, and wherein a capacity of the second memory is greater than a capacity of the first memory.

10. The semiconductor apparatus of claim 9, wherein the first portion of the temporal graph is stored to the first memory in accordance with a compressed-sparse row data structure.

11. The semiconductor apparatus of claim 9, wherein the logic is to exclude index data from the first portion of the temporal graph.

12. The semiconductor apparatus of claim 9, wherein the logic is to retrieve vertices of the second portion in response to a selectivity of an input query being below a cost model threshold, wherein the input query is to identify one of a duration upper bound or an end time upper bound in a first dimension, and wherein the input query is to identify a start time upper bound and a start time lower bound in a second dimension.

13. The semiconductor apparatus of claim 9, wherein the logic coupled to the one or more substrates includes transistor channel regions that are positioned within the one or more substrates.

14. A method comprising:

storing a first portion of a temporal graph to a first memory of a single server;

generating index data for one or more vertices of the temporal graph in response to a degree of the one or more vertices exceeding a degree threshold;

organizing the index data into a heap in a first dimension and a binary search tree in a second dimension incorporating the index data into a second portion of the temporal graph; and storing the second portion of the temporal graph to a second memory of the single server, wherein an access rate of the first memory is greater than an access rate of the second memory, and wherein a capacity of the second memory is greater than a capacity of the first memory.

15. The method of claim 14, wherein the first portion of the temporal graph is stored to the first memory in accordance with a compressed-sparse row data structure.

16. The method of claim 14, further including excluding index data from the first portion of the temporal graph.

17. The method of claim 14, further including retrieving vertices of the second portion in response to a selectivity of an input query being below a cost model threshold, wherein the input query identifies one of a duration upper bound or an end time upper bound in a first dimension, and wherein the input query identifies a start time upper bound and a start time lower bound in a second dimension.

\*   \*   \*   \*   \*